F. A. DINSMORE.
SALT CELLAR.
APPLICATION FILED AUG. 14, 1907.
899,716.
Patented Sept. 29, 1908.
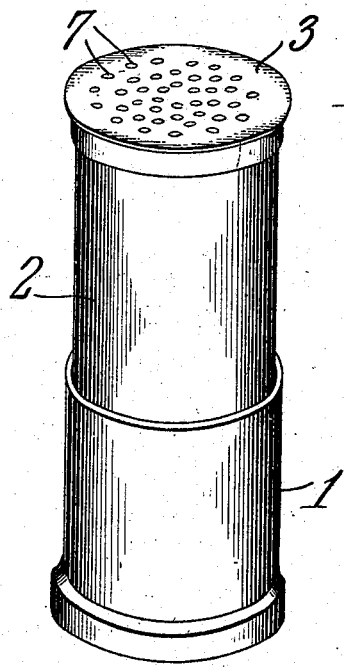
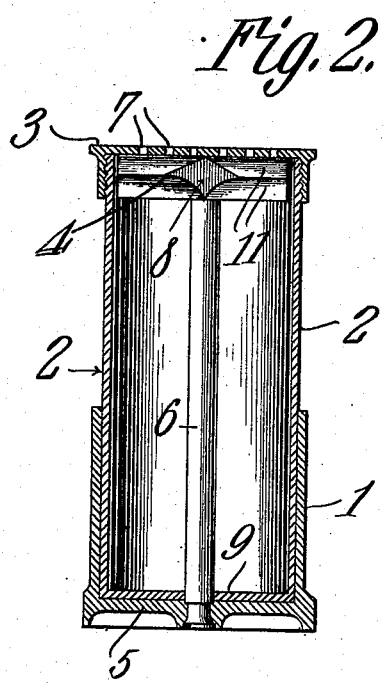
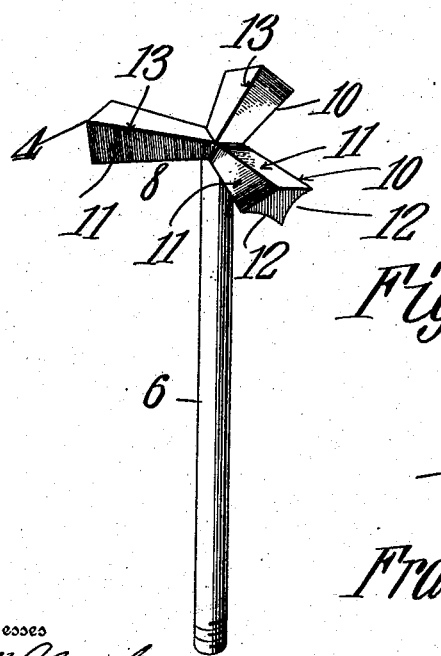
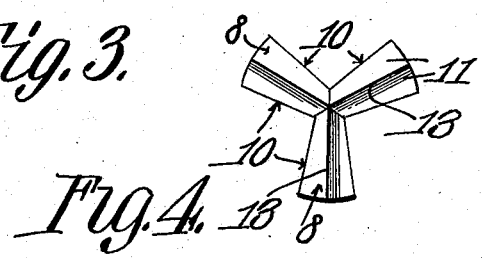
Frank A. Dinsmore
INVENTOR.
Witnesses
By C. A. Snow & Co
Attorneys
THE NORRIS PETERS CO., WASHINGTON, D. C.

UNITED STATES PATENT OFFICE.

FRANK A. DINSMORE, OF FREDONIA, NEW YORK.

SALT-CELLAR.

No. 899,716.   Specification of Letters Patent.   Patented Sept. 29, 1908.

Application filed August 14, 1907. Serial No. 388,531.

*To all whom it may concern:*

Be it known that I, FRANK A. DINSMORE, a citizen of the United States, residing at Fredonia, in the county of Chautauqua and State of New York, have invented a new and useful Salt-Cellar, of which the following is a specification.

This invention relates to a salt container and shaker, the object of which is to provide a convenient, useful and adequate device contained within the salt receptacle for partly closing the outlet opening in the cover when the contained salt is fine and dry, but when damp or lumpy, the same means may be used to break the lumps into smaller particles and then force them through the outlet openings.

With this and other objects in view, the invention comprises the various novel features of construction and combination and arrangement of parts, which will be more fully hereinafter described and pointed out particularly in the appended claims.

In the accompanying drawing:—Figure 1 is a perspective view of an improved salt shaker and container. Fig. 2 is a vertical section of the same. Fig. 3 is a perspective view of the salt breaker or grinder. Fig. 4 is a plan view of the same.

The corresponding parts in the several figures are indicated throughout by similar characters of reference.

The salt container and shaker or as commonly known "salt-cellar", is comprised of three principal parts, namely, the base 1, the salt holder 2 with its cap 3, and the internal salt grinder 4.

The base 1 is made in the form of a cup and preferably cylindrical. The bottom 5 of the base has attached to its center, either by riveting, threading, or other fastening means, a vertical stem 6 to the upper end of which is firmly attached the salt grinder or cutter 4. The grinder in this instance is formed of three horizontal arms equally disposed around the stem 6, and by their peculiar shape they are enabled to scrape the top of the salt-cellar free from any adhering salt; cut and break up salt lumps, and to force damp or moist salt through the holes in the cover 3.

The salt holder 2 consists of a cylindrical shell adapted to fit and move freely within the base 1, and at its top a screw thread is formed for the cap 3 which is of usual form, that is to say, having a flat circular top provided with numerous perforations 7 through which salt is distributed, and a flange depending from the top threaded on the top of the holder 2.

The arms 8 of the salt grinder 4 are long enough to reach the interior surface of the salt holder 2, so that when rotated, any salt adhering to the sides of the holder will be removed, it being understood, of course, that the ends of the arms are curved concentric to the salt holder 2. Each arm 8 is approximately diamond shaped in cross section, the longer axis of which lies in a horizontal plane. The upper angular faces of the arms are straight while those below the horizontal axis are of curved form, that is to say, each side or face is concaved from the side edges of the arms to the lower edges thereof.

The bottom 9 of the salt receptacle or holder 2 has a central perforation through which the stem 6 freely passes, so that said parts may move one from the other in an opposite direction. The sides of the base 1 extend up sufficiently high from the bottom to afford means for grasping the same when the salt-cellar is to be used.

In the operation of the invention, the cap 3 is removed and the holder filled with salt, after which the cap is returned to place. If the salt be fine and dry, the salt-cellar is grasped in a manner to hold the bottom 1 and holder 2 against vertical movement, so that when the cellar is reversed to shake out the salt, there will be no sliding movement between the said parts, and the grinder will be held in close contact with the underside of the cap 3, thus reducing the area of the perforated top by the amount of surface presented by the grinder. From this it will be noted that when the salt, as above stated, is fine and dry, fewer perforations are freely open to the exit of salt and, therefore, the latter will not pour out through the holes at such a rapid rate as it would were all the openings entirely uncovered. When salt has been left standing for some time in the salt-cellar, it becomes hard and lumpy through the alternate drying and moistening due to weather conditions. Under such conditions, the holder 2 is grasped in the left hand and with the right hand the base 1 is rotated causing the arms 8 to cut and break up the salt by means of their sharp edges 10; a part of the salt thus broken up is forced downwardly under the angle 11 of the arms 8, while other portions ride up and over the concaved faces 12. During this process, the base and holder may be moved longitudinally so as to break up a great quantity of hardened salt. When the salt is damp or moist and refuses to be shaken out of the openings 7, the salt-cellar is taken up as before and the bottom rotated on the holder 2, pushing it towards the outer end at the same time. The angles 13 of the arms 8 are thus forced against the under surface of the cap, so that these edges keep the cap clean and free from salt, while the inclined faces 11 force the salt in a downward direction and out through the holes in the cap.

A salt-cellar constructed in accordance with the present invention may be made entirely of metal, metal and glass, or other materials which, together, will form an ornamental and useful combination.

What is claimed is:—

1. A salt cellar comprising a base, a salt holder having a cylindrical interior surface longitudinally and rotatably mounted in said base and having a flat removable perforated cap, and a salt grinder within the salt holder having a plurality of radial arms extending to the inner cylindrical surface of said salt holder, said grinder fixed to the upper end of a stem rising from the base in the axis of said holder, said grinder adapted to be moved from the cap to the bottom of the salt holder and scrape adhering salt from the inner surface thereof.

2. A salt cellar comprising a cup like cylindrical base, a cylindrical salt holder rotatably and longitudinally mounted in said base and having a cylindrical inner surface throughout its length, the bottom of said salt holder having a central opening, a flat cap provided with a plurality of perforations for the escape of salt, a salt grinder within said holder having a plurality of arms extending to the inner surface of said salt holder each of which arms is adapted to contact with the under surface of said cap to remove adhering salt, a stem fastened to said base extending through the central opening in the bottom of the salt holder for supporting the salt grinder, the latter being movable from end to end of the salt holder.

3. A salt cellar comprising a cup-like base, a cylindrical salt holder rotatably and longitudinally mounted in said base, a flat perforated cap screwed onto the top of said salt holder, a stem attached to said base extending upwardly in the axis of said salt holder, and a salt grinder fastened to the upper end of said stem and formed with a plurality of equally spaced radial arms, each arm being diamond shaped in cross section with its upper faces lying in inclined planes and its under faces of concave formation.

4. A salt cellar comprising a cup-like base, a cylindrical salt holder rotatably and longitudinally mounted in said base, a flat perforated cap screwed onto the top of said salt holder, a stem attached to said base extending upwardly in the axis of said salt holder, and a salt grinder fastened to the upper end of said stem and formed with a plurality of horizontal equally disposed radial arms each having a length equal to the radius of the vessel within which it operates and of diamond shape in cross section, the longer axis of which lies in a horizontal plane, the upper faces of each arm lying in inclined planes to form a radial edge, the under faces of each of said arms having a concaved formation and the side edges adapted to cut salt within the salt-cellar.

In testimony that I claim the foregoing as my own, I have hereto affixed my signature in the presence of two witnesses.

FRANK A. DINSMORE.

Witnesses:
OLIVE P. JENKINS,
EDNA L. SMITH.